(12) United States Patent
Song

(10) Patent No.: US 9,198,006 B2
(45) Date of Patent: Nov. 24, 2015

(54) SELECTIVE REVIEW OF BUNDLED MESSAGES FROM A WIRELESS COMMUNICATION DEVICE

(71) Applicant: QUALCOMM Incorporated, San Diego, CA (US)

(72) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 13/737,789

(22) Filed: Jan. 9, 2013

(65) Prior Publication Data

US 2013/0121235 A1    May 16, 2013

Related U.S. Application Data

(63) Continuation of application No. 12/212,490, filed on Sep. 17, 2008, now Pat. No. 8,547,044.

(60) Provisional application No. 60/974,840, filed on Sep. 24, 2007.

(51) Int. Cl.
*H04W 4/08* (2009.01)
*H04L 12/911* (2013.01)
(Continued)

(52) U.S. Cl.
CPC ............. *H04W 4/08* (2013.01); *H04L 12/1886* (2013.01); *H04L 29/08765* (2013.01); *H04L 47/827* (2013.01); *H04W 4/10* (2013.01);
(Continued)

(58) Field of Classification Search
CPC ..... H04W 4/08; H04W 4/006; H04W 12/189; H04L 47/35; H04L 29/08765; H04L 47/41; H04L 47/827

USPC ............... 370/338, 527, 529, 395.2
See application file for complete search history.

(56) References Cited

U.S. PATENT DOCUMENTS 6,028,866 A    2/2000 Engel et al.
6,442,684 B1   8/2002 Lee et al.
(Continued)

FOREIGN PATENT DOCUMENTS

EP    1912363 A1     4/2008
JP    2000341326 A  12/2000
(Continued)

OTHER PUBLICATIONS

3GPP2 C.S0024-A, "cdma2000 High Rate Packet Data Air Interface Specification", Version 3.0, Sep. 2006, pp. 1-1163.
(Continued)

*Primary Examiner* — Warner Wong
(74) *Attorney, Agent, or Firm* — Michael F. Taveira

(57) ABSTRACT

A system, method, and computer device that allow a wireless communication device to selectively bundle messages in an access channel communication packet being sent to another computer device on the wireless communication network, such as a base station are disclosed. The bundled messages are typically sent in response to a request sent to the wireless communication device for response to a specific event, such as the setup of a group communication call. The receiving computer device determines if the access channel communication packet contains data indicating one or more bundled messages are therewithin such that resources only then will expended to review the bundled messages to check for the availability of the requested resources.

24 Claims, 4 Drawing Sheets

(51) Int. Cl.
*H04L 29/08* (2006.01)
*H04W 4/10* (2009.01)
*H04W 76/00* (2009.01)
*H04L 12/18* (2006.01)
*H04W 74/00* (2009.01)
*H04L 29/06* (2006.01)

(52) U.S. Cl.
CPC ........ *H04W 76/005* (2013.01); *H04L 12/1818* (2013.01); *H04L 65/4061* (2013.01); *H04W 74/00* (2013.01)

(56) References Cited

U.S. PATENT DOCUMENTS

| | | | |
|---|---|---|---|
| 6,654,342 | B1 | 11/2003 | Dittia et al. |
| 6,952,411 | B2 | 10/2005 | Sinnarajah et al. |
| 7,319,666 | B2 | 1/2008 | Goosman |
| 7,561,896 | B2 | 7/2009 | Csapo et al. |
| 7,590,092 | B2 | 9/2009 | Milton et al. |
| 7,649,913 | B2 | 1/2010 | Lee et al. |
| 7,822,046 | B2 | 10/2010 | Wing et al. |
| 7,864,716 | B1* | 1/2011 | Manroa et al. ................ 370/260 |
| 8,103,279 | B2* | 1/2012 | Berteau et al. ................ 455/445 |
| 8,165,072 | B2* | 4/2012 | Mooney et al. ............... 370/329 |
| 8,457,044 | B2 | 6/2013 | Song |
| 2004/0215813 | A1* | 10/2004 | Halna Du Fretay et al. .. 709/236 |
| 2005/0041625 | A1 | 2/2005 | Brewer |
| 2005/0078653 | A1 | 4/2005 | Agashe et al. |
| 2005/0111393 | A1* | 5/2005 | Jeong et al. ................... 370/312 |
| 2005/0111939 | A1 | 5/2005 | Kuipers et al. |
| 2005/0163155 | A1 | 7/2005 | Yang et al. |
| 2005/0281208 | A1 | 12/2005 | Dorenbosch et al. |
| 2006/0281481 | A1 | 12/2006 | Hayashi et al. |
| 2007/0064609 | A1 | 3/2007 | Igarashi |
| 2007/0091894 | A1 | 4/2007 | Kang et al. |
| 2007/0202906 | A1 | 8/2007 | Lindner |
| 2007/0238442 | A1 | 10/2007 | Mate et al. |
| 2007/0248060 | A1 | 10/2007 | Mooney et al. |
| 2007/0248063 | A1* | 10/2007 | Habetha ........................ 370/338 |
| 2007/0286148 | A1 | 12/2007 | Yang et al. |
| 2008/0144666 | A1 | 6/2008 | Ross et al. |
| 2010/0329225 | A1 | 12/2010 | Balasubramanian |
| 2012/0287856 | A1 | 11/2012 | Ketchum et al. |

FOREIGN PATENT DOCUMENTS

| | | |
|---|---|---|
| JP | 2006345407 A | 12/2006 |
| JP | 2007508614 A | 4/2007 |
| KR | 20040030154 | 4/2004 |
| WO | WO-03017621 | 2/2003 |
| WO | WO-03036911 | 5/2003 |
| WO | WO-2005020598 | 3/2005 |
| WO | WO-2005036852 A1 | 4/2005 |
| WO | WO-2006110997 A1 | 10/2006 |

OTHER PUBLICATIONS

3GPP2 C.S0063-A, "cdma2000 High Rate Packet Data Supplemental Services", Version 2.0, Mar. 2007, pp. 1-252.

International Search Report—PCT/US08/077002, International Search Authority—Euopean Patent Office—Feb. 3, 2009.

Written Opinion—PCT/US08/077002, International Search Authority—Euopean Patent Office—Feb. 3, 2009.

* cited by examiner

SELECTIVE REVIEW OF BUNDLED MESSAGES FROM A WIRELESS COMMUNICATION DEVICE

CLAIM OF PRIORITY UNDER 35 U.S.C. §120

The present Application for Patent is a Continuation of U.S. patent application Ser. No. 12/212,490, entitled "SELECTIVE REVIEW OF BUNDLED MESSAGES FROM A WIRELESS COMMUNICATION DEVICE", filed Sep. 17, 2008, which claims priority to Provisional Application No. 60/974,840, entitled "SYSTEM AND METHOD FOR SELECTIVE REVIEW OF BUNDLED MESSAGES FROM A WIRELESS COMMUNICATION DEVICE", filed Sep. 24, 2007, each of which is assigned to the assignee hereof and hereby expressly incorporated by reference herein in its entirety.

BACKGROUND OF THE INVENTION

1. Field of the Invention

The present invention relates to point-to-point or point-to-multipoint wireless communications systems. More specifically, the present invention relates to systems and methods for selectively reviewing messages that may be bundled in a transmission from a wireless communication device.

2. Description of the Related Art

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor.

For PTT communications, it is desirous to minimize the call setup time or otherwise the latency can stall the communication, or cause a false floor grant when one or more target mobile devices did not have resources available for the PTT call. If the PTT system utilizes existing cellular network infrastructure, the existing call signaling methods based upon standard traffic channel setup often prove too slow for a fully responsive PTT communication system.

Accordingly, it would be advantageous to provide a system and method to expedite PTT communication setup with a target wireless communication device given the time-sensitivity of the communication. The system and method should be able to allow for multiple messages being sent as quickly as possible, which will expedite the PTT communication setup, without compromising the resources of the wireless communication device or base station. It is thus to the provision of such a system and method to expedite communications from a target wireless communication device that the present invention is primarily directed.

SUMMARY OF THE INVENTION

Embodiments of the invention include a system, method, and computer device that allow a wireless communication device to selectively bundle messages requesting resources and send them in an access channel communication packet to other computer devices on a wireless communication network, such as a base station, which assists in rely of time-sensitive communications. The bundled messages are typically sent in response to a request sent to the wireless communication device for response to a specific event, such as the setup of a push-to-talk call. The receiving computer device determines if the access channel communication packet contains data indicating one or more bundled messages are therewithin before utilizing resources to review one or bundled messages and check for the availability of requested resources.

DETAILED DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Figure 1:
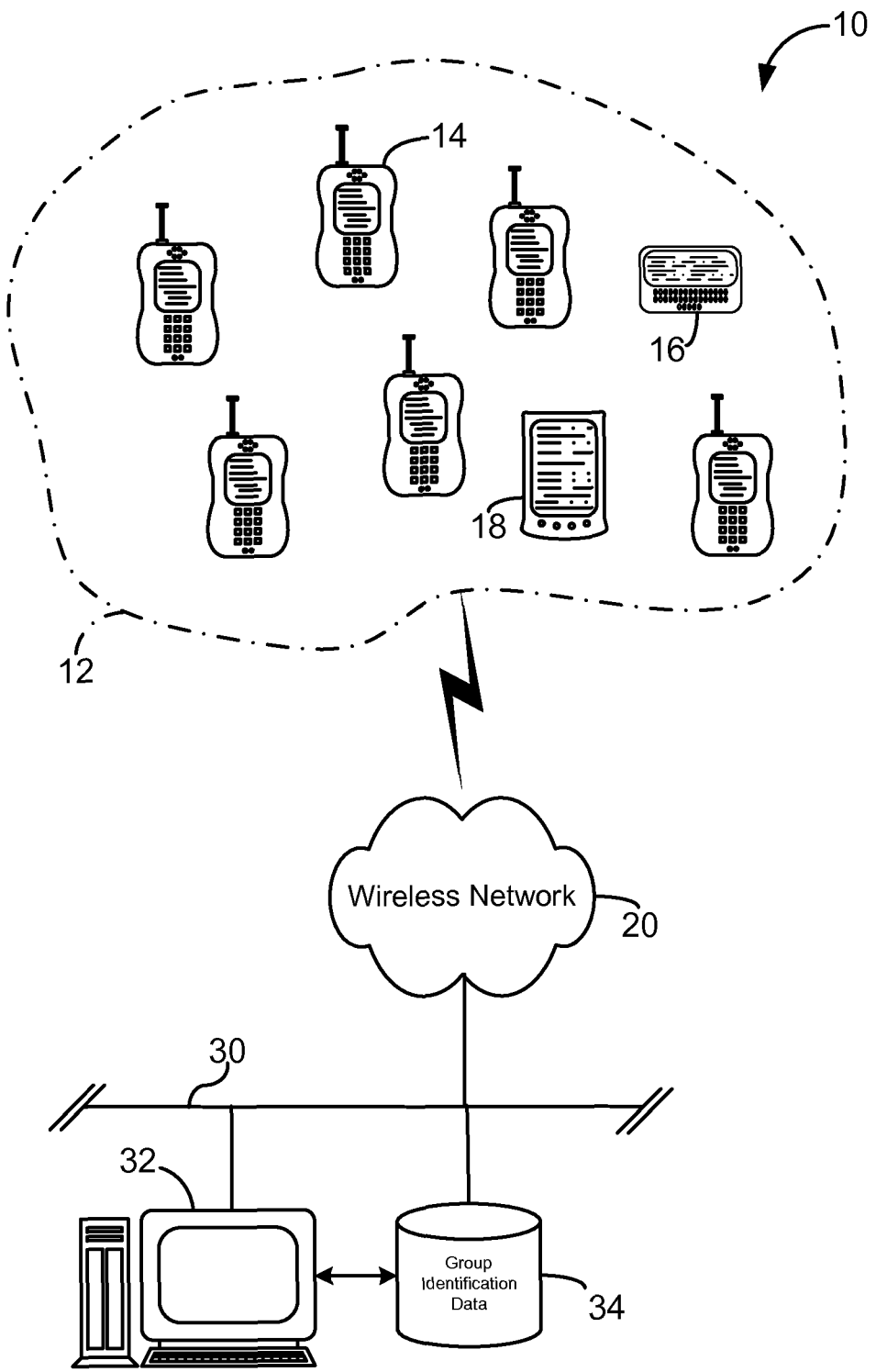
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of the system 10 for with a group communication server 32 to one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) sends a flag to at least the group communication computer device, shown here as server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share is with other computer devices resident on the server-side LAN 30 or accessible across the wireless network 20. The group communication computer device 32 can have an attached or accessible database 34 to store the group identification data for the wireless devices. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14,16,18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

In overview, the system 10 selectively communicates to a wireless communication device 14,16,18 for a group communication across the wireless communication network 20 with the a group communication server 32 configured to receive a request at to establish a group communication with at least one target wireless communication device (e.g. mobile telephone 14), and the group communication server 32 send a request to the at least one target wireless communication device across the wireless communication network 20 indicating an incoming group communication. An intermediate computer device (such as base station controller 64 in FIG. 2) receives an access channel communication packet across an access channel from the at least one target wireless communication device that received the request to establish a group communication from the group communication server 32. The access communication packet indicates the whether or not there are bundled messages present in the packet, such as messages indicating the resources for the group communication to the at least one wireless communication device 14. Through the bundling of messages, the wireless communication device 14,16,18 can quickly send messages indicating the ability to handle the incoming communication, without the other computer device (such as base station 60) needing to examine all messages send from the wireless communication device 14,16,18 for bundled messages.

The group communication can be voice, applications, graphic media, such as pictures in JPEG, TIF, and the like, or audio files such as MP3, MP4, WAV, and the like. The media can also be streaming media, such as a multimedia application (Powerpoint, MOV file, and the like). Also, the group communication is typically half-duplex audio conferencing among members of the communication group 12.

Figure 2:
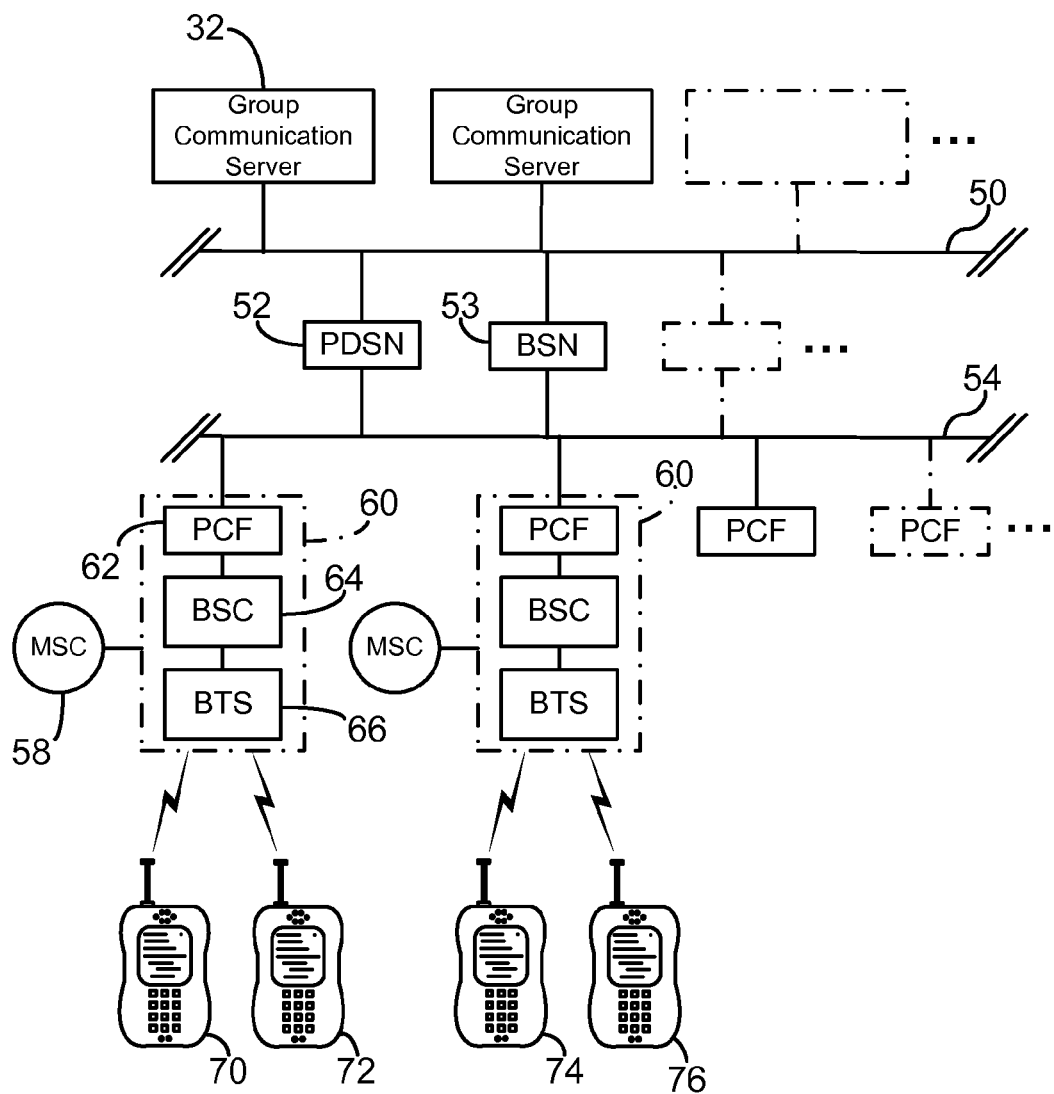
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service providers packet data service node (PDSN) such as PSDN 52, and/or a broadcast serving node 53 shown here resident as on a carrier network 54. Each PSDN 52 or BSN 53 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the base transceiver station (sometimes referred to as "branch-to-source")(BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or be at the control of, the group communication server 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
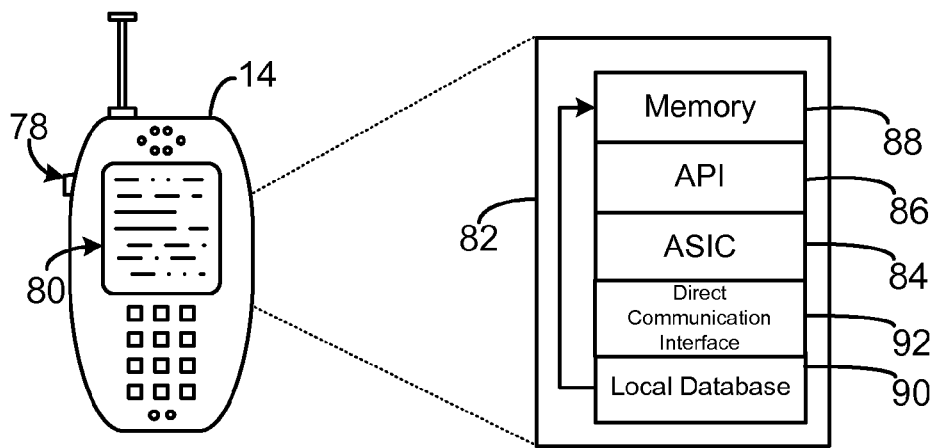
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group communications. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

In this embodiment of the wireless device, the computer platform 82 also includes a direct communication interface 92 that can open the direct communication channel from the wireless device, typically for the half-duplex voice communication in a PTT call. The direct communication interface 92 can also be part of the standard communication interface for the wireless device which ordinarily carries the voice and data transmitted to and from the wireless device. The direct communication interface 92 typically is comprised of hardware as is known in the art.

The system 10 provides a mechanism for the base station controller 64 to search for the bundled messages within an access channel communication packet from a target wireless communication device only when necessary, and when received, the base station controller 64 will check the availability of the requested resources. If the requested resources are not available, the base station controller 64 remarks the differentiated service code point (DSCP) of the IP header of the access channel communication packet and forwards the packet to the PDSN 53. The group communication server 32 reads the DSCP value of the call request packet and takes appropriate actions according to the value, i.e. determines if the target wireless communication device 14,16,18 for the group communication is available.

In the "evolution data-optimized" (EV-DO) standard for wireless communications, a data-over-signaling (DOS) message is defined as a transport mechanism to deliver short application packets over the Access Channel (AC) or Control Channel (CC) between the base station and mobile telecommunication device.

In one embodiment, at the time of initial call set-up request, the base station controller 64 can send the request to the wireless communication device 14,16,18 as encapsulated in a DOS message and send it over the AC to the wireless communication device 14,16,18, since the message is short and very delay-sensitive. In such a case, the DOS message is expected to be bundled with other messages that request resources for an upcoming PTT call. For example, in the EV-DO standard, in order to request Traffic Channel (TCH) resources with a certain quality-of-service (QoS) requirement, the wireless communication device 14,16,18 can bundle the DOS message with a "Connection Request" message and the "ReservationOnRequest" message in the same access probe to the base station. In another example, the wireless communication device 14,16,18 can bundle the DOS message with a "BCMCSFlowRegistration" message to request broadcast channel (BCH) resources.

In one embodiment, existing headers for the access channel communication packet as defined in the EV-DO standard are used. Specifically, both the multi-flow packet application (MFPA) and enhanced multi-flow packet application (EM-FPA) DOS headers contain the "reset" field. According to the standard, this one-bit field must be always set to 0 for a mobile-originated DOS since the reset operation can be initiated only by the base station controller 64. Here, the wireless communication device 14,16,18 will set this field to 1 in order to request the base station controller 62 to read the bundled messages before forwarding the access channel communication packet to the PDSN 52. When the base station controller 64 receives a DOS message from the wireless communication device 14,16,18, it first looks at the reset field to determine if it needs to read the bundled messages. If the reset=0, the base station controller 64 just forwards the DOS payload to the PDSN 52 for ultimate transmission, either directly or indirectly, to the group communication server 32. If reset=1, the base station controller 64 searches for the bundled messages and checks the availability of the requested resources. For instance, if a BCMCSFlowRegistration message was bundled, the base station controller 64 checks the availability of the broadcast channel resources. If the resources are available, the base station controller 64 simply forwards the packet to the PDSN 52 without changing the DSCP value. If not, the base station controller 64 changes the DSCP value of the IP header of the packet to a specific value indicating unavailability of the requested resources. It then forwards the DOS payload to the PDSN 52, which ultimately notifies, or is sent to the group communication server 32.

In another embodiment, the base station controller 64 can search for the bundled messages whenever it receives a DOS message from the wireless communication device 14,16,18. This doesn't require the wireless communication device 14, 16, 18 to indicate the presence of the bundled messages using the reset field. In this case, however, the base station controller 64 need to check the presence of bundled messages for every DOS message received from the wireless communication device 14, 16, 18. The base station controller 64 determines a message is bundled with the DOS message if it is received within a certain time distance from the reception of the DOS message.

Figure 4:
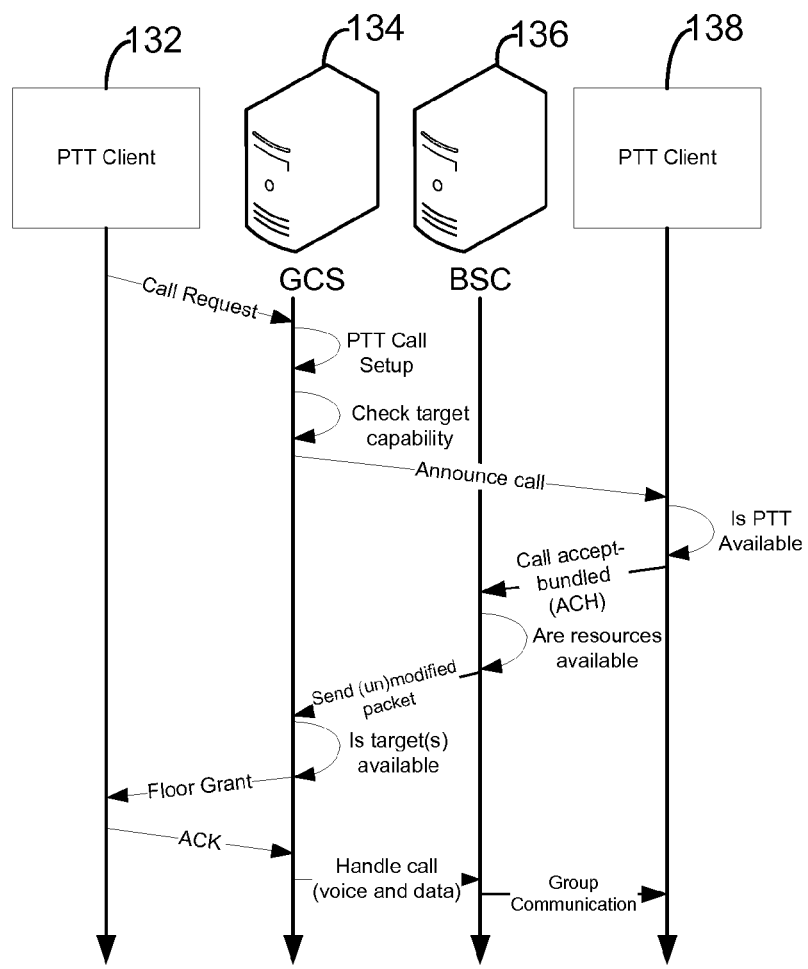
FIG. 4 is a call flow diagram of one embodiment of the base station controller with modified acknowledgement packet headers for a target wireless device that responds to an incoming PTT set-up request.

FIG. 4 is a call flow diagram of one embodiment of the establishment of a PTT communication and a group-directed media transmission between communication group member wireless communication devices. A communicating wireless device, here PTT client 132, requests to establish a direct PTT call with the target devices of the communication group 12, shown here as PTT Client 138. The call setup request can contain, for instance, the target user address, a Group application ID, or a request to establish a group. The call setup request may also be sent with a DataOverSignaling (DOS) Access channel message. The Group Communication Server (GCS) 134 performs the PTT call setup functions, including locating the target. In addition, the GCS 134 notifies the target device (PTT client 138) that a PTT call is being established with group-media data included.

The target PTT Client 138 will receive the incoming call announcement and verify that it has the resources available to participate in the PTT call. The target PTT Client 138 sends an acknowledgement to the GCS 134 indicating that the resources are or are not available through modification of the header of the access channel communication packet, as shown in the embodiment described above. For purposes of illustration here, it is assumed that the target PTT client 138 does have resources available. Once the access channel communication packet is received from the target PTT Client 138, the BSC 136 reviews the header to see of examination of the bundled messages therein is warranted, and if not, remark the DSCP in the IP header of the call accept message before forwarding the message to the GCS 134. The GCS 134 determines if the target device is available and if so, sends the floor grant to the originating PTT Client 132, which indicates the call is being established and the PTT Client 132 can start talking (often with an audible "beep" to the user of the device). Then the GCS 134 will handle the PTT communication and send it to the target device (PTT client 138).

Figures 5A, 5B:
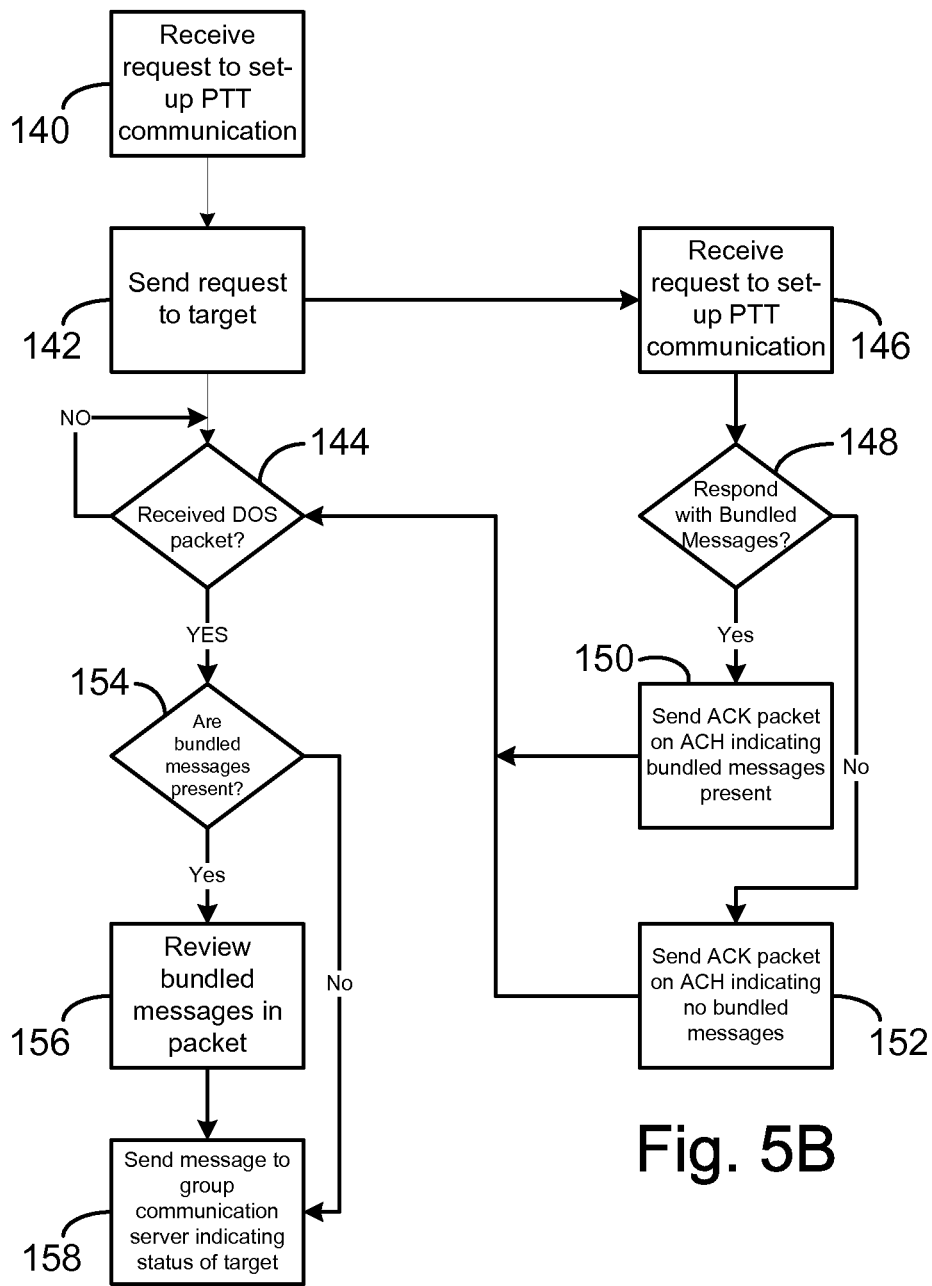
FIG. 5A is a flowchart of one embodiment of the request for resources from the target wireless device to the base station controller and the modification of the access channel communication packet header.
FIG. 5B is a flowchart of one embodiment of the target wireless communication device interacting with the base station in FIG. 5A.

FIG. 5A is a flowchart of one embodiment of the request for resources to the target wireless device 14,16,18 from the base station 60 and the modification of the access channel communication packet header if resources are not available, and FIG. 5B is a flowchart of one embodiment of the target wireless communication device 14,16,18 interacting with the base station 60 in FIG. 5A. The base station 60 receives the request from the group communication server 32 to setup the PTT communication to the target wireless device 14,16,18, as shown at step 140, and then sends a request to the target wireless device 14,16,18 as shown at step 142, to notify the wireless communication device of the incoming PTT call, and request that the device acknowledge its status to handle the PTT call. Then the base station 60 waits for a DOS packet to receive the response from the target wireless communication device 14, 16, 18, as shown at decision 144. Then a determination is made as to whether the target wireless communication device 14,16,18 has responded to the request, as shown at decision 144.

At the target wireless communication device 14,16,18, as shown in FIG. 5B, the request is received indicating the setup of the PTT communication, as shown at step 146, and then a determination is made as to whether bundled messages will be needed to generate a response, as shown at decision 148. If the bundled messages are needed at decision 148, the access channel communication packet header is modified to indicate that bundled messages are present and that packet is sent to the base station 60, such as altering the reset bit as described above, as shown at step 150. Otherwise, if there is no need to send bundled messages at decision 148, then the target wireless communication device 14,16,18 sends and access channel communication packet indicating no bundled messages, as shown at step 152, to the base station 60.

At the base station 60, which is in a wait state at decision 144, waiting for a response from the target wireless device 14,16,18, once the access channel communication packet is received at decision 144, a determination is then made as to whether bundled messages are present in the access channel communication packet, as shown at decision 154. In one embodiment, this determination is examining the header data of the access channel communication packet to set if the reset bit is flipped by the target wireless communication device 14,16,18 indicating that the messages within the packet should be examined, and that the resources for the PTT are probably not available. If bundled messages are present at decision 154, then the access channel communication packet is searched for messages, as shown at step 156. Then, and if there are no bundled messages indicated at decision 154, the appropriate acknowledgment from the target wireless communication device is sent ultimately to the group communications server 32. It should be noted that other computer devices and pathway of the packet or message from the base station 60 to the group communication server 32 can be used in the present system. In one embodiment, if the resources of the target wireless device 14,16,18 are available, the acknowledgement is sent to the group communication server 32 that the target wireless communication device 14,16,18 is ready for the PTT call. Here, the notice is preferably sent to the group communication server 32 so that the floor can be granted to the originating wireless communication device.

It can thus be seen that system 10 provides, in one embodiment, an inventive method for bundling of messages send from a target wireless communication device 14,16,18 through using an access channel communication packet that includes a header thereof. The computer device, such as base station 60, receives a request to communicate to the wireless computer device, 14,16,18, such as a PTT call from a group communication server 32. Then sending an access communication packet from the at least one target wireless communication device 14,16,18 across an access channel on the wireless communication network 20 indicating the presence of bundled messages within the packet, and receiving the access channel communication packet at an another computer device (such as base station 60). If the data in the access channel communication packet indicates the presence of bundled messages, then the other computer device will examine the packet for the bundled messages.

In one embodiment, sending a group communication is establishing a half-duplex voice communication broadcast channel. If the access channel communication packet includes a header containing a plurality of signaling bits, the method will then include changing one or more bits of the signaling bits to indicate the presence of bundled messages. Further, the wireless communication device 14,16,18 can send the access channel communication packet to the base station 60. The method can include the group communication server 32 not permitting the group communication if resources to the at least one target wireless communication device 14,16,18 are not available. Alternately, the group communication server 32 can selectively ignore indication that resources are not available for the group communication to the at least one target and permit the group communication.

Further, the determination as to resources being available can be determining if the establishment of a traffic channel to the at least one target wireless communication device 14,16, 18 for the group communication is possible. The intermediate computer device can also send the request to the at least one target wireless communication device 14,16,18 indicating an incoming group communication through a control channel to the at least one target wireless communication device 14,16, 18. In one embodiment, the intermediate computer device can determine if resources are available for the traffic channel.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A method of setting-up a group communication session at a target communication device, comprising:
   receiving, at the target communication device, an announcement message that announces the group communication session to be arbitrated by a group communication server;
   configuring a bundled message that includes at least (i) a first message configured to indicate, to the group communication server, that the target communication device accepts the announced group communication session, and (ii) a second message configured to request, from an access network, resources for supporting the group communication session; and
   transmitting the configured bundled message to the access network along with a flag to prompt the access network to evaluate the second message and selectively modify the first message to indicate a determined resource unavailability when the access network determines that a resource requested by the second message is unavailable.

2. The method of claim 1, wherein the first message corresponds to an acknowledgment to the announcement message.

3. The method of claim 1, wherein the second message includes a request for traffic channel (TCH) resources, a request for Quality of Service (QoS) resources and/or a request for broadcast channel (BCH) resources.

4. A method of setting-up a group communication session at a target communication device, comprising:
   receiving, at the target communication device, an announcement message that announces the group communication session to be arbitrated by a group communication server;
   configuring a bundled message that includes at least (i) a first message configured to indicate, to the group communication server, that the target communication device accepts the announced group communication session, and (ii) a second message configured to request, from an access network, resources for supporting the group communication session; and
   transmitting the configured bundled message to the access network along with a flag to prompt the access network to evaluate the second message and selectively modify the first message based on the evaluation,
   wherein the second message includes a request for traffic channel (TCH) resources, a request for Quality of Service (QoS) resources and/or a request for broadcast channel (BCH) resources, and
   wherein the request for TCH resources corresponds to a ConnectionRequest message, and the request for QoS resources corresponds to a ReservationOnRequest message and the request for BCH resources corresponds to a BCMCSFlowRegistration message.

5. The method of claim 1, wherein the transmitting transmits the configured bundled message as a data-over-signaling (DOS) packet on an access channel.

6. The method of claim 5, wherein the flag corresponds to one or more fields contained in a header of the DOS packet.

7. A method of setting-up a group communication session at an access network, comprising:
   transmitting, to a target communication device, an announcement message that announces the group communication session to be arbitrated by a group communication server;
   receiving, in response to the transmission of the announcement message, a bundled message that includes at least (i) a first message configured to indicate, to the group communication server, that the target communication device accepts the announced group communication session, and (ii) a second message configured to request, from the access network, resources for supporting the group communication session;
   determining whether the resources requested by the second message are available; and
   selectively modifying the first message to indicate, to the group communication server, whether the resources requested by the second message are determined to be available, wherein when the determining determines the resources requested by the second message are unavailable, the selectively modifying modifies the first message to indicate the determined resource unavailability.

8. The method of claim 7, wherein when the determining determines the resources requested by the second message are available, the selectively modifying does not modify the first message.

9. The method of claim 8, further comprising: transmitting the unmodified first message to the group communication server.

10. The method of claim 7, wherein the selectively modifying modifies the first message by changing one or more fields within a header of the first message.

11. The method of claim 10, wherein the one or more fields include a differentiated service code point (DSCP) value of an Internet Protocol (IP) header of the first message.

12. The method of claim 7, further comprising: transmitting the modified first message to the group communication server.

13. The method of claim 7, wherein the first message corresponds to an acknowledgment to the announce message.

14. The method of claim 7, wherein the second message includes a request for traffic channel (TCH) resources, a request for Quality of Service (QoS) resources and/or a request for broadcast channel (BCH) resources.

15. The method of claim 14, wherein the request for TCH resources corresponds to a ConnectionRequest message, and the request for QoS resources corresponds to a ReservationOnRequest message and the request for BCH resources corresponds to a BCMCSHowRegistration message.

16. The method of claim 7, wherein the bundled message corresponds to a data-over-signaling (DOS) packet On an access channel.

17. The method of claim 16, wherein the first and second messages are interpreted by the access network as bundled within the DOS packet if the first and second messages are received within a threshold period of time of the DOS packet.

18. The method of claim 7, wherein the determining and the selectively modifying are performed in response to a flag contained in the bundled message.

19. A target communication device configured to set-up a group communication session, comprising:
means for receiving an announcement message that announces the group communication session to be arbitrated by a group communication server;
means for configuring a bundled message that includes at least (i) a first message configured to indicate, to the group communication server, that the target communication device accepts the announced group communication session, and (ii) a second message configured to request, from an access network, resources for supporting the group communication session; and
means for transmitting the configured bundled message to the access network along with a flag to prompt the access network to evaluate the second message and selectively modify the first message to indicate a determined resource unavailability when the access network determines that a resource requested by the second message is unavailable.

20. An access network configured to set-up a group communication session, comprising:
means for transmitting, to a target communication device, an announcement message that announces the group communication session to be arbitrated by a group communication server;
means for receiving, in response to the transmission of the announcement message, a bundled message that includes at least (i) a first message configured to indicate, to the group communication server, that the target communication device accepts the announced group communication session, and (ii) a second message configured to request, from an access network, resources for supporting the group communication session;
means for determining whether the resources requested by the second message are available; and
means for selectively modifying the first message to indicate, to the group communication server, whether the resources requested by the second message are determined to be available,
wherein when the means for determining determines the resources requested by the second message are unavailable, the means for selectively modifying modifies the first message to indicate the determined resource unavailability.

21. A target communication device configured to set-up a group communication session, comprising:
a communication interface configured to receive an announcement message that announces the group communication session to be arbitrated by a group communication server; and
a processor configured to configure a bundled message that includes at least (i) a first message configured to indicate, to the group communication server, that the target communication device accepts the announced group communication session, and (ii) a second message configured to request, from an access network, resources for supporting the group communication session,
wherein the communication interface is further configured to transmit the configured bundled message to the access network along with a flag to prompt the access network to evaluate the second message and selectively modify the first message to indicate a determined resource unavailability when the access network determines that a resource requested by the second message is unavailable.

22. An access network configured to set-up a group communication session, comprising:
a communication interface configured to transmit, to a target communication device, an announcement message that announces the group communication session to be arbitrated by a group communication server, and to receive, in response to the transmission of the announcement message, a bundled message that includes at least (i) a first message configured to indicate, to the group communication server, that the target communication device accepts the announced group communication session, and (ii) second message configured to request, from the access network, resources for supporting the group communication session; and
a processor configured to determine whether the resources requested by the second message are available, and to selectively modify the first message to indicate, to the group communication server, whether the resources requested by the second message are determined to be available,
wherein when the processor determines the resources requested by the second message are unavailable, the processor is configured to selectively modify the first message to indicate the determined resource unavailability.

23. A non-transitory computer-readable medium containing instructions stored thereon, which, when executed by a target communication device configured to set-up a group communication session, cause the target communication device to perform operations, the instructions comprising:

program code to receive an announcement message that announces the group communication session to be arbitrated by a group communication server;

program code to configure a bundled message that includes at least (i) a first message configured to indicate, to the group communication server, that the target communication device accepts the announced group communication session, and (ii) a second message configured to request, from an access network, resources for supporting the group communication session; and program code to transmit the configured bundled message to the access network along with a flag to prompt the access network to evaluate the second message and selectively modify the first message to indicate a determined resource unavailability when the access network determines that a resource requested by the second message is unavailable.

24. A non-transitory computer-readable medium containing instructions stored thereon, which, when executed by an access network configured to set-up a group communication session, cause the access network to perform operations, the instructions comprising:

program code to transmit, to a target communication device, an announcement message that announces the group communication session to be arbitrated by a group communication server;

program code to receive, in response to the transmission of the announcement message, a bundled message that includes at least (i) a first message configured to indicate, to the group communication server, that the target communication device accepts the announced group communication session, and (ii) a second message configured to request, from the access network, resources for supporting the group communication session;

program code to determine whether the resources requested by the second message are available; and program code to selectively modify the first message to indicate, to the group communication server, whether the resources requested by the second message are determined to be available, wherein when the program code causes the access network to determine the resources requested by the second message are unavailable, the program code causes the access network to selectively modify the first message to indicate the determined resource unavailability.

* * * * *